United States Patent
McLaren et al.

(10) Patent No.: US 11,247,773 B2
(45) Date of Patent: Feb. 15, 2022

(54) PYLON MOUNTED TILT ROTOR

(71) Applicant: Kitty Hawk Corporation, Palo Alto, CA (US)

(72) Inventors: Campbell McLaren, Alameda, CA (US); Pranay Sinha, Sunnyvale, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 3 days.

(21) Appl. No.: 16/899,991

(22) Filed: Jun. 12, 2020

(65) Prior Publication Data

US 2021/0387724 A1 Dec. 16, 2021

(51) Int. Cl.
*B64C 29/00* (2006.01)
*B64D 29/02* (2006.01)
*B64D 27/24* (2006.01)
*B64D 33/08* (2006.01)

(52) U.S. Cl.
CPC .......... *B64C 29/0033* (2013.01); *B64D 27/24* (2013.01); *B64D 29/02* (2013.01); *B64D 33/08* (2013.01)

(58) Field of Classification Search
CPC . B64C 29/0033; B64C 29/0075; B64C 27/52; B64C 27/28; B64D 33/08; B64D 13/006
See application file for complete search history.

(56) References Cited

U.S. PATENT DOCUMENTS

| | | |
|---|---|---|
| 2,456,151 A * | 12/1948 | Sawyer .................. B64D 33/08 416/94 |
| 2,937,823 A | 5/1960 | Fletcher |
| 2,989,269 A | 6/1961 | Le Bel |
| 3,081,964 A | 3/1963 | Quenzler |
| 3,089,666 A * | 5/1963 | Quenzler .................. B64C 9/24 244/7 R |
| 3,121,544 A * | 2/1964 | Alvarez-Calderon ....... B64C 23/08 244/10 |
| 3,159,361 A | 12/1964 | Weiland |
| 3,179,354 A | 4/1965 | Alvarez-Calderon |
| 3,949,957 A | 4/1976 | Portier |
| 4,080,922 A | 3/1978 | Brubaker |
| 4,746,081 A | 5/1988 | Mazzoni |

(Continued)

OTHER PUBLICATIONS

Author Unknown, Aerial Ridesharing at Scale, Uber Elevate, Oct. 3, 2019, Retrieved from http://web.archive.org/web/20191003070118/https://www.uber.com/us/en/elevate/uberair/.

(Continued)

*Primary Examiner* — Richard R. Green
*Assistant Examiner* — Arfan Y. Sinaki
(74) *Attorney, Agent, or Firm* — Van Pelt, Yi & James LLP (57) ABSTRACT

A tilt rotor system, comprising: a pylon portion that includes: an upper protrusion that is configured to be in contact with an upper surface of a wing and a lower protrusion that is configured to be in contact with a lower surface of the wing; and a rotor portion that includes a rotor, wherein the rotor portion is able to move between: (1) a first position that is associated with a vertical flight mode and (2) a second position that is associated with a forward flight mode. The pylon portion further includes an air intake vent, a horizontal surface, a rotor controller, and a heat sink.

14 Claims, 10 Drawing Sheets

(56) References Cited

U.S. PATENT DOCUMENTS

| | | | |
|---|---|---|---|
| 4,930,725 A * | 6/1990 | Thompson | F02C 7/12 |
| | | | 244/53 R |
| 4,979,698 A | 12/1990 | Lederman | |
| 5,454,531 A | 10/1995 | Melkuti | |
| 6,561,456 B1 | 5/2003 | Devine | |
| 9,694,906 B1 | 7/2017 | Sadek | |
| 9,957,042 B1 | 5/2018 | Vander Lind | |
| 9,975,631 B1 | 5/2018 | McLaren | |
| 10,144,503 B1 * | 12/2018 | Vander Lind | B64C 29/0025 |
| 10,710,741 B2 | 7/2020 | Mikić | |
| D892,710 S | 8/2020 | Vander Lind | |
| 10,773,799 B1 | 9/2020 | Thrun | |
| 10,843,807 B2 | 11/2020 | Bevirt | |
| 10,845,823 B2 | 11/2020 | Burghardt | |
| 2003/0094537 A1 | 5/2003 | Austen-Brown | |
| 2005/0133662 A1 | 6/2005 | Magre | |
| 2005/0230520 A1 | 10/2005 | Kusic | |
| 2006/0118675 A1 | 6/2006 | Tidwell | |
| 2006/0144992 A1 | 7/2006 | Jha | |
| 2010/0051753 A1 | 3/2010 | Yoeli | |
| 2011/0001020 A1 | 1/2011 | Forgac | |
| 2011/0155859 A1 | 6/2011 | Vetters | |
| 2011/0168835 A1 | 7/2011 | Oliver | |
| 2012/0286102 A1 | 11/2012 | Sinha | |
| 2013/0221154 A1 | 8/2013 | Vander Lind | |
| 2014/0158816 A1 | 6/2014 | Delorean | |
| 2015/0028151 A1 | 1/2015 | Bevirt | |
| 2015/0136897 A1 | 5/2015 | Seibel | |
| 2015/0232178 A1 | 8/2015 | Reiter | |
| 2015/0266571 A1 | 9/2015 | Bevirt | |
| 2015/0344134 A1 * | 12/2015 | Cruz Ayoroa | B64C 39/12 |
| | | | 244/48 |
| 2016/0101853 A1 | 4/2016 | Toppenberg | |
| 2016/0288903 A1 | 10/2016 | Rothhaar | |
| 2017/0036760 A1 | 2/2017 | Stan | |
| 2017/0203839 A1 | 7/2017 | Giannini | |
| 2018/0002011 A1 | 1/2018 | McCullough | |
| 2018/0002012 A1 | 1/2018 | McCullough | |
| 2018/0029693 A1 | 2/2018 | Vander Lind | |
| 2018/0086447 A1 | 3/2018 | Winston | |
| 2018/0265193 A1 | 9/2018 | Gibboney | |
| 2018/0305005 A1 | 10/2018 | Parks | |
| 2019/0112028 A1 * | 4/2019 | Williams | B64C 3/32 |
| 2019/0135424 A1 * | 5/2019 | Baity | B64C 11/46 |
| 2019/0135425 A1 * | 5/2019 | Moore | B64D 27/24 |
| 2019/0256194 A1 * | 8/2019 | Vander Lind | B64C 11/46 |
| 2019/0329863 A1 * | 10/2019 | King | B64C 29/0033 |
| 2019/0352002 A1 | 11/2019 | Schulte | |
| 2020/0130858 A1 * | 4/2020 | Julien | B64D 41/00 |
| 2020/0272141 A1 | 8/2020 | Chung | |

OTHER PUBLICATIONS

Mark Moore, Vehicle Collaboration Strategy and Common Reference Models, Uber Elevate Transformative VTOL Workshop, Jan. 2018.

* cited by examiner

PYLON MOUNTED TILT ROTOR

BACKGROUND OF THE INVENTION

New types of electric aircraft are being developed for use in urban environments. For example, electrical vertical takeoff and landing (eVTOL) vehicles are attractive because they do not require a long runway. Instead, such eVTOL vehicles can take off from and/or land in relatively small spaces, such as parking lots, building rooftops, or other open spaces in urban environments. In some cases, these eVTOL vehicles have a relatively unique combination and/or arrangement of components or parts. As a result, new types of vehicle components associated with these new types of eVTOL vehicles may be developed. For example, as a vehicle goes through developmental versions, improved component embodiments (e.g., to reduce assembly time of the vehicle as a whole and/or to improve the structural integrity and/or airworthiness of the vehicle) may be developed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a tilt rotor system that is used in an electric vertical takeoff and landing (eVTOL) vehicle are described herein. As will be described in more detail below, in various embodiments, the tilt rotor examples described herein show various features that improve the assembly of the vehicle (e.g., the tilt rotor is able to be attached in a more secure manner to the wing), improve the structural integrity or airworthiness of the vehicle, and/or optimize the heat dissipation of the electrical components within the pylon portion of the tilt rotor. However, before such examples are described, it may be helpful to show an example of an eVTOL vehicle which includes such a tilt rotor. The following figure describes one such exemplary eVTOL vehicle.

Figure 1:
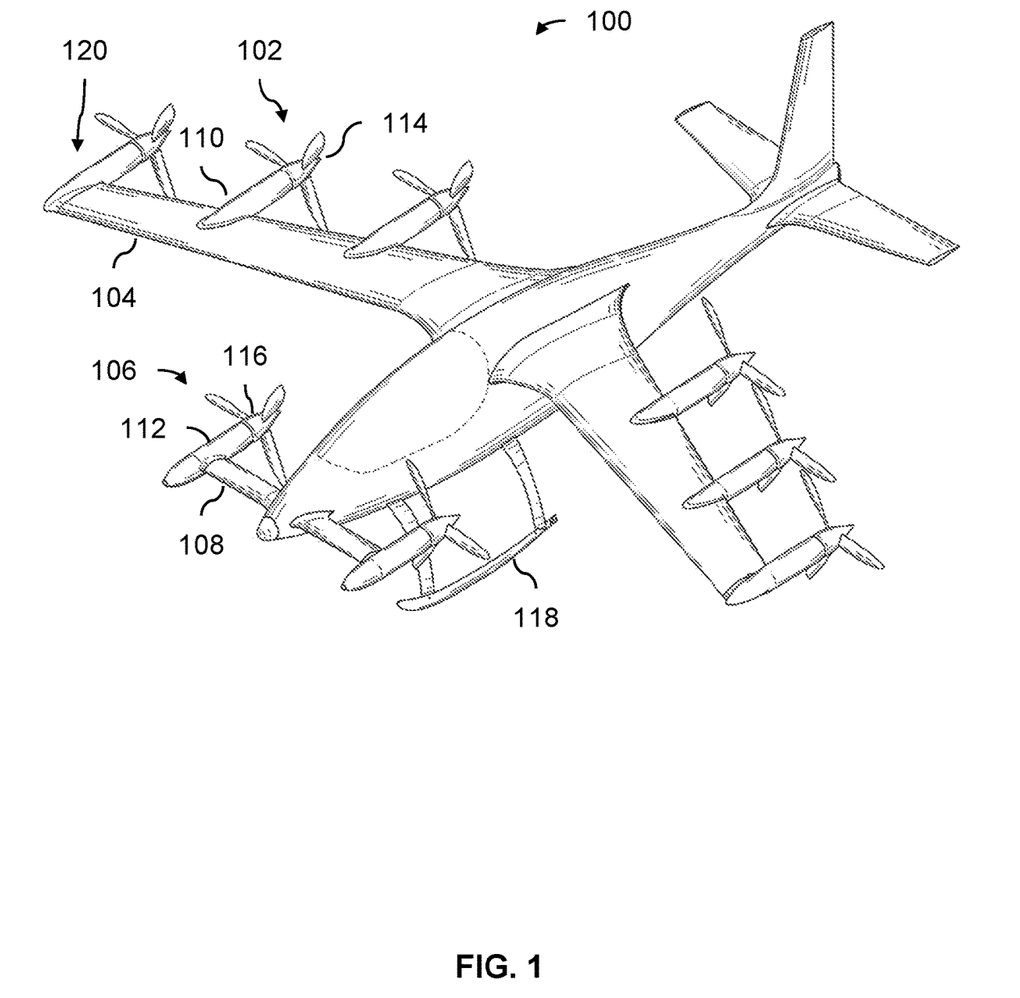
FIG. 1 is a diagram illustrating an embodiment of an electric vertical takeoff and landing (eVTOL) vehicle with tilt rotors.

FIG. 1 is a diagram illustrating an embodiment of an electric vertical takeoff and landing (eVTOL) vehicle with tilt rotors. In the example shown, the vehicle (100) includes six tilt rotors (e.g., 102) which are attached to a forward-swept main wing (104) and two tilt rotors (e.g., 106) which are attached to a canard (108). All of the tilt rotors include a pylon portion (e.g., 110 and 112) via which the tilt rotor system is attached to the wing or canard. This pylon portion does not move when the moveable rotor portion of the tilt rotor system (e.g., 114 and 116) tilts between a downward pointing position (e.g., when the vehicle is operating in a hovering and/or vertical flight mode which is not shown here) and a backward pointing position (e.g., when the vehicle is operating in forward flight or wing-borne flight mode which is shown here). For context, the vehicle measures within a range of 3-6 meters from nose to tail with a wingspan within a range of 6-8 meters.

In one example flight sequence, the vehicle takes off vertically by orienting all of the tilt rotors to point downward and then using the tilt rotors to provide vertical thrust and lift. This may be attractive in urban areas because the vehicle's takeoff and landing footprint is much smaller than conventional takeoff and landing vehicles which require a long runway.

Once the vehicle has taken off and has achieved some desired altitude, the vehicle transitions to a forward flight mode by rotating the tilt rotors so that they point backwards and produce horizontal thrust. The tilt rotors may be rotated using a variety of actuators and any appropriate actuator may be used. This forward flight mode is attractive because it is much more energy efficient to fly using wing-borne flight compared to relying on the tilt rotors to generate all of the vertical lift required to keep the vehicle airborne. In some embodiments, one or more of the tilt rotors are turned off when in forward flight mode to conserve power if not all of the tilt rotors are required to be rotating in order to keep the vehicle airborne.

To land (in this example, vertically), the tilt rotors are rotated so that they point downward once again so that the vehicle hovers in air. The vehicle then vertically descends to a landing point on the ground. If needed, any tilt rotors that were turned off during forward flight mode are turned on. As described above, the vehicle's ability to take off and land vertically is desirable because the vehicle can land in a smaller area or footprint. However, if desired, the exemplary vehicle can perform a traditional landing (which would require a runway) by keeping the tilt rotors in the forward flight position (i.e., pointing backwards as shown here) and using the exemplary skids (118) or wheels (not shown here) to land.

The combination of a canard and forward-swept main wing (as shown in this example) is attractive because of its performance, for example, in the event of a stall. The canard will stall first before the main wing, creating a significant pitching moment and not much loss of lift at stall whereas a main wing stall loses significant lift per change in pitching moment (e.g., causing the entire aircraft to drop or fall). Stalls are thus potentially more benign with a canard compared to without a canard. The canard stall behavior is particularly beneficial in combination with a swept forward wing, as the stall of the main wing can create an adverse pitching moment if at the wing root and can create large and dangerous rolling moments if at the wing tip. Furthermore, a canard can create lift at low airspeeds and increase $CL_{max}$ (i.e., maximum lift coefficient) and provides a strut to hold or otherwise attach the canard tilt rotor systems to.

Another benefit to using pusher-style (i.e., attached to the trailing edge of the main wing) tilt rotor systems with a fixed (main) wing as shown here is that stall behavior (or lack thereof) is improved during the transition from hover position to cruise position or vice versa. With a tilt wing vehicle (which was tested in an earlier prototype), the wing's angle of attack (and subsequently forces on the wing) undergo large, discontinuous changes as the wing tilts from a completely stalled condition to an unstalled condition. In contrast, with the vehicle shown in this example, the vehicle can be flown such that the wing angle of attack does not increase beyond the stall angle. Also, this configuration adds both dynamic pressure and circulation over the main wing, which substantially improves the behavior during a transition (e.g., from hover position to cruise position or vice versa). In other words, the total time for transition can be reduced and transition can be more efficient and be performed at lower airspeeds, leading to increased safety.

Another benefit associated with tilt rotor vehicles (e.g., as opposed to tilt wing vehicles) is that a smaller mass fraction is used for the tilt actuator(s). That is, multiple actuators for multiple tilt rotor systems (still) comprise a smaller mass fraction than a single, heavy actuator for a tilt wing vehicle. There are also fewer points of failure with tilt rotor vehicles since there are multiple actuators as opposed to a single (and heavy) actuator for a tilt wing vehicle. Another benefit is that a fixed wing vehicle makes the transition (e.g., between a cruising mode or position and a hovering mode or position) more stable and/or faster compared to a tilt wing vehicle.

The example vehicle shown here is a relatively new vehicle that has gone through multiple development cycles. In an earlier version of the vehicle, the inboard, main-wing tilt rotors (e.g., the ones not located at the tips of the canard and main wing) were attached to the trailing edge or surface of the main wing by first cutting out an elliptical shape in the main wing. The elliptically-shaped distal end of the pylon portion would then be inserted into the similarly shaped cutout and then two parts would be attached (e.g., using adhesives, by applying a flexible material over the surfaces of both the pylon portion and the main wing, etc.).

One disadvantage is the resulting structural integrity and/or airworthiness of the vehicle may be less than desired. For example, the vehicle may be able to fly and/or maneuver at relatively high speeds (e.g., on the order of 150-200 knots), subjecting the vehicle to relatively high forces and/or moments. New tilt rotor components which, when attached to the vehicle, produce a vehicle with better structural integrity would be desirable. As with any aircraft, improving structural integrity and/or airworthiness is always an important design consideration.

The following figures show a tilt rotor system embodiment and a (main) wing embodiment prior to attachment of the tilt rotor system to the wing.

Figure 2A:
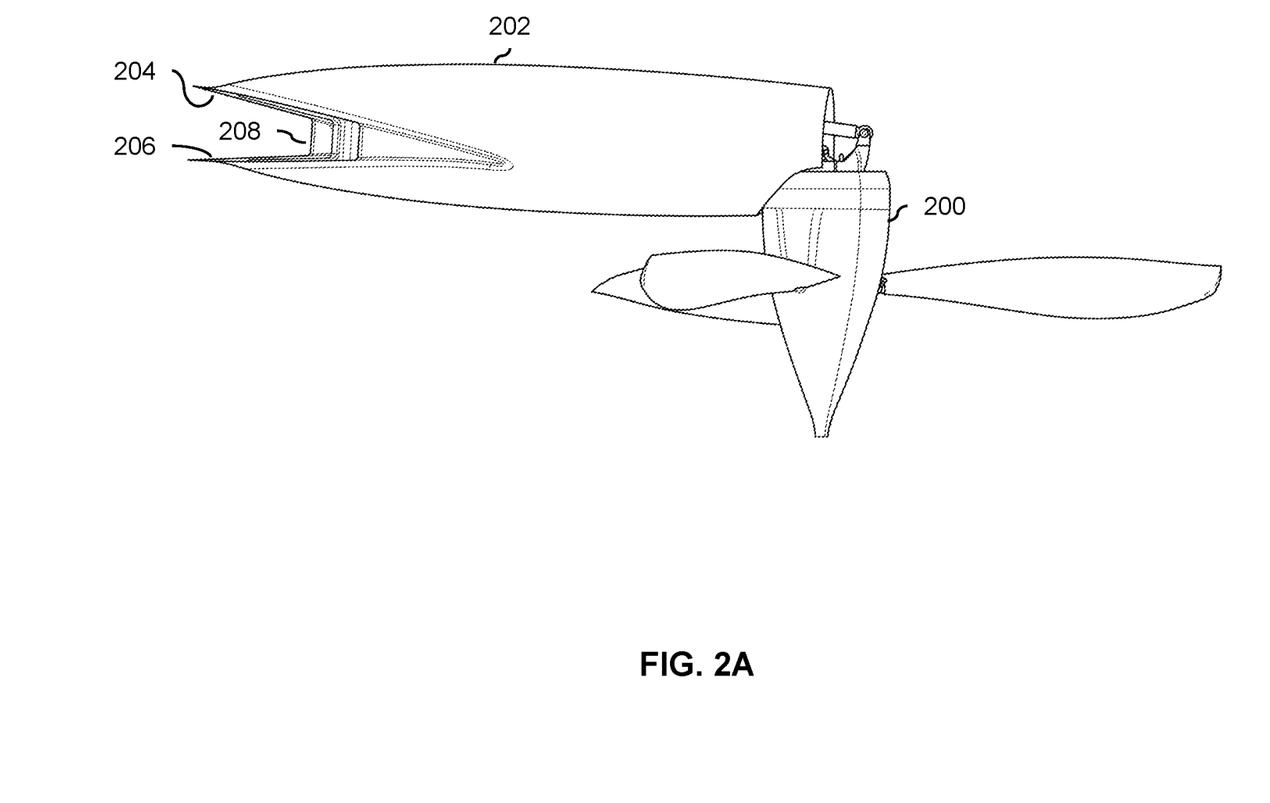
FIG. 2A is a diagram illustrating an embodiment of a tilt rotor system prior to attachment to a wing.

FIG. 2A is a diagram illustrating an embodiment of a tilt rotor system prior to attachment to a wing. In this example, the exemplary tilt rotor system is configured to be attached to the trailing edge of a main wing. For example, inboard tilt rotor 102 from FIG. 1 may be implemented as shown. The outboard tilt rotors (e.g., tilt rotor 120 in FIG. 1) or the canard tilt rotors (e.g., tilt rotor 106 in FIG. 1) may be implemented with some modifications to accommodate the slightly different attachment points or interfaces. In this example, the rotor portion (200) of the tilt rotor system is in a vertical flight mode (i.e., pointing downward).

The pylon portion (202) of the tilt rotor system is used to attach the tilt rotor system (at least in this example) to the exposed aft spar (not shown here) of a (main) wing. In this example, the pylon portion includes an opening or interface at the distal end of the pylon portion (202) opposite the rotor portion (200) that is designed to fit around the main wing. The surfaces exposed in this part of the pylon include an upper contacting surface (204) as well as a lower contacting surface (206) that fit against the upper surface and lower surface of the main wing (not shown), respectively, when the tilt rotor system and wing are coupled or otherwise attached.

In this example, there is also a vertical contacting surface (208) which comes into contact with some vertical surface of the main wing. Naturally, in some embodiments this surface is excluded. For example, the main wing may taper to a point such that the pylon and the main wing have a V-shaped interface. In that case, the upper contacting surface and lower contacting surface of the pylon section would meet in a V without any intervening contacting surface, such as vertical contacting surface (208). In some embodiments, the pylon and the main wing may have a more rounded, U-shaped interface where the upper and lower contacting surfaces curve into each other. The design of the wing-pylon interface and associated surfaces that come into contact with each other may vary depending upon the application, vehicle materials, and/or design objectives.

As shown in this example, in some embodiments, a tilt rotor system includes a pylon portion that includes an upper contacting surface that is configured to be in contact with an upper surface of a wing when the tilt rotor system and the wing are coupled. The pylon portion also includes a lower contacting surface that is configured to be in contact with a lower surface of the wing when the tilt rotor system and the wing are coupled. The tilt rotor system further includes a rotor portion that includes a rotor, where the rotor portion is moveably coupled to the pylon portion such that the rotor portion is able to move between: (1) a first position that is associated with a vertical flight mode of a vehicle that includes the tilt rotor system and the wing and (2) a second position that is associated with a forward flight mode of the vehicle that includes the tilt rotor system and the wing.

Figure 2B:
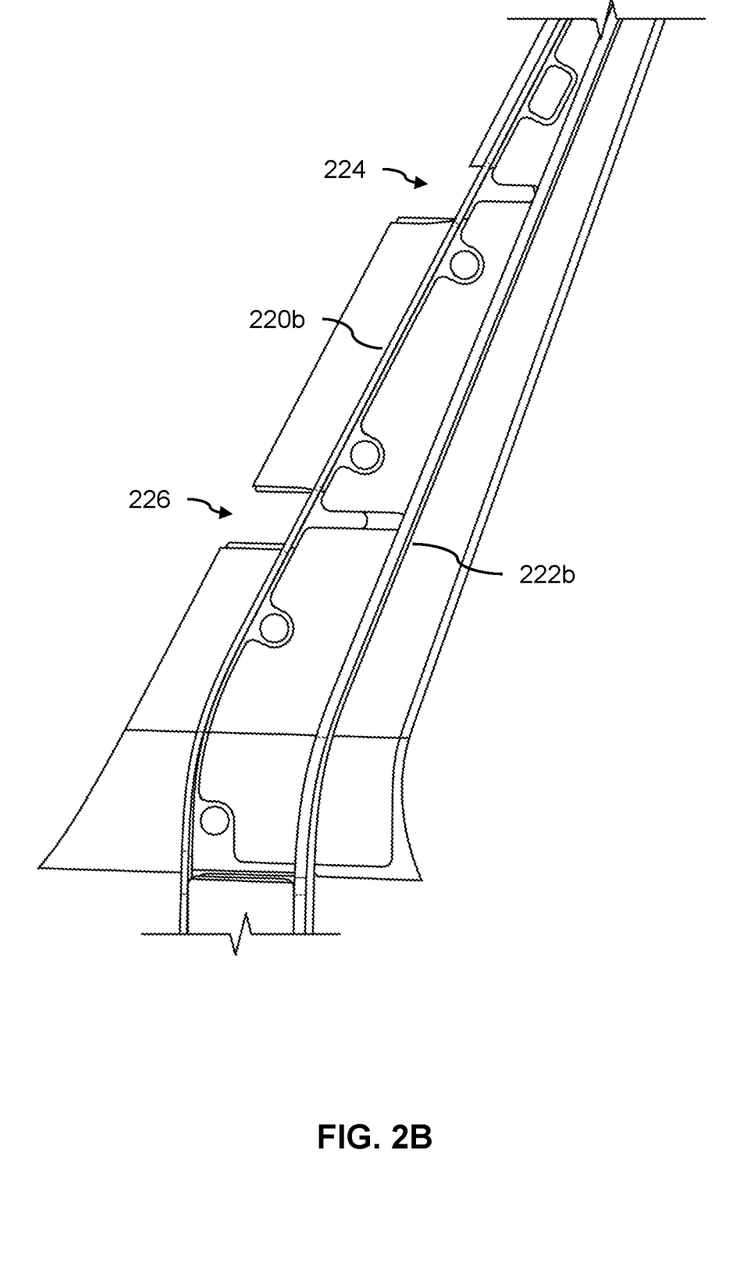
FIG. 2B is a diagram illustrating an embodiment of a wing prior to attachment of a tilt rotor system.

FIG. 2B is a diagram illustrating an embodiment of a wing prior to attachment of a tilt rotor system. For example, the main wing (104) in FIG. 1 may be implemented as shown before the various tilt rotors are attached. In the example of FIG. 1, the exemplary eVTOL vehicle is designed to be relatively lightweight in order to extend range and/or battery life. For context, the example vehicle shown in FIG. 1 weighs within a range of 350-450 kg. As such, the exterior of the aircraft (including the exterior of the main wing) is made of a composite material which is lighter than other materials (e.g., it is lighter than a metal airframe). To provide structural support, the main wing in this example has two continuous spars (220b and 222b) which extend from the tip of the wing shown, through the fuselage (not shown).

In this example, the wing has two gaps or exposed sections (224 and 226) which the pylons of the tilt rotors fit into (not shown) and which expose the aft spar (220b) to the pylon so that the pylon is in contact with the aft spar when the tilt rotor system is attached. Although not shown from this view, the spars extend vertically inside the main wing from the top interior surface to the bottom interior surface. The exposed sections of the aft spar therefore present vertical surfaces for the pylons to come into contact with and match or otherwise correspond to the vertical contacting surface (208) shown in FIG. 2A. Structurally, it may be desirable to have the pylon (and thus the tilt rotor system) be in direct (or practically direct) contact with the (exposed) aft spar (as shown here) as opposed to having the pylon attach to (only) composite material which may flex or bend and in general is less stable.

As described above, in this example the wing is at least partially made of composite material. In some embodiments, the two gaps or two exposed sections (224 and 226) are created by forming the composite material in segments, leaving spaces or gaps between segments. This may produce a stronger and/or more secure connection between the tilt rotor systems and the canard or wing.

The following figures show the exemplary tilt rotor system and exemplary wing after they are coupled to each other.

Figure 2C:
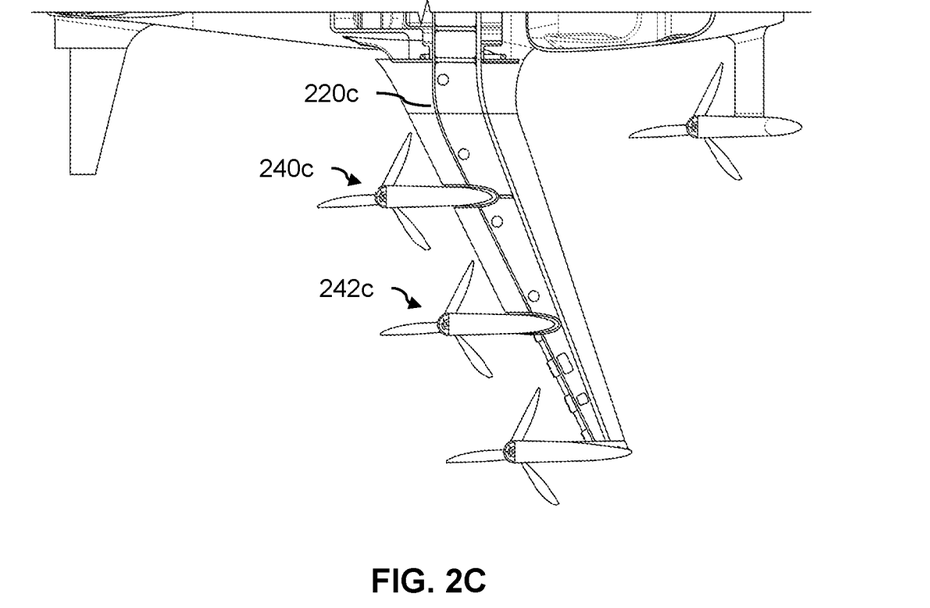
FIG. 2C is a diagram illustrating an embodiment of a top view of a main wing with tilt rotors attached.

FIG. 2C is a diagram illustrating an embodiment of a top view of a main wing with tilt rotors attached. In the state shown here, all of the tilt rotors have been attached to the vehicle. As shown here, the inboard tilt rotors (240c and 242c) are attached to the main wing in such a way that the pylon's opening wraps around the aft spar (220c). In various embodiments, the tilt rotors are secured using an adhesive on the surface(s) where the pylon comes into contact with the main wing or canard, and/or by adding one or more layers of composite where the pylon meets the main wing or canard. As described above, having the pylons wrap around the main wing, and more specifically, around an aft spar which is one of the strongest parts of the main wing, as shown here may improve the airworthiness and/or structural stability of the vehicle compared to previous versions of the vehicle that attached the tilt rotors using a elliptically-shaped cutout in the wing and an elliptically-shaped pylon.

Figure 2D:
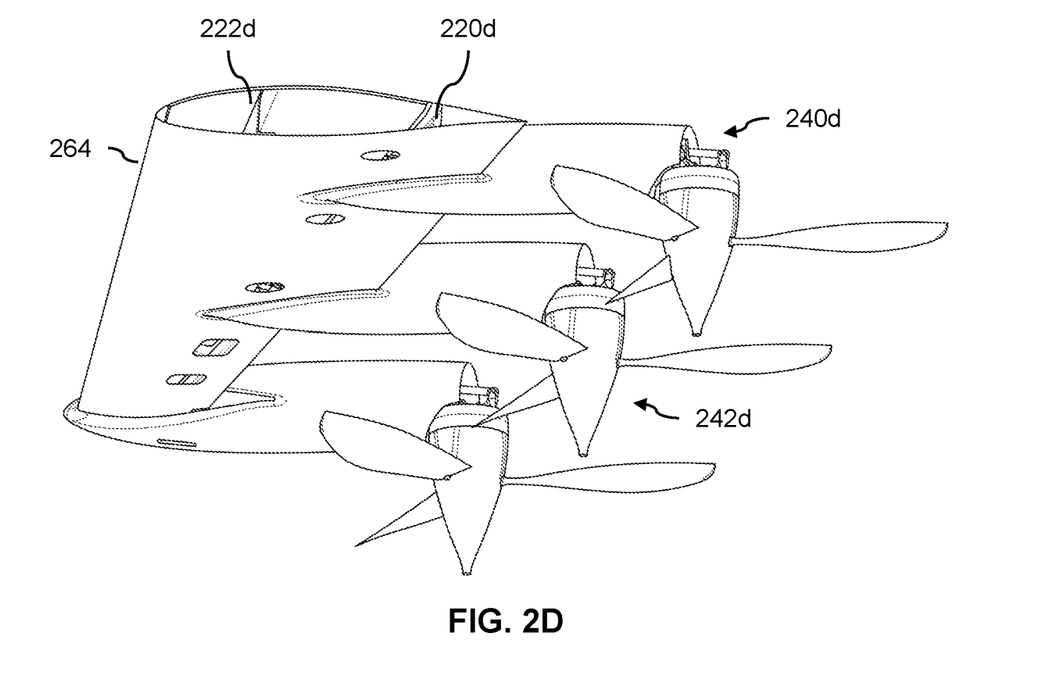
FIG. 2D is a diagram illustrating an embodiment of an angled view of a main wing with tilt rotors attached.

FIG. 2D is a diagram illustrating an embodiment of an angled view of a main wing with tilt rotors attached. The systems shown in FIG. 2C and FIG. 2D are in the same state (e.g., of assembly) but shown from different angles. From this view, both the forward spar (222d) and the aft spar (220d) are visible within the main wing (264). The openings of the pylons of the inboard tilt rotors (240d and 242d) wrap around the main wing (264). As described above, the pylons of the tilt rotors are in contact with and/or flush against the aft spar (220d), which permits a more secure and/or stronger interface between the inboard tilt rotors (240d and 242d) and the main wing (264).

For convenience, the above example shows a complete tilt rotor system. In practice, various components may be attached and/or built up in any sequence or order as desired. For example, if desired, only the pylons of the tilt rotors (e.g., without the rotor portion and internal components) may be attached to the canard and main wing. The pylon without the rotor and internal components is much lighter, making it easier to align and bond to the wing, which saves costs in terms of equipment needed for integration and time for setting up the bond. Subsequently, the rotor portion of the tilt rotor system and internal components are attached to the pylon portion.

In addition to and/or as an alternative to improved features associated with attaching tilt rotors to the main wing or canard, internal components within the tilt rotor system may be arranged in a manner that takes into account thermal dissipation. The following figures show an example of this.

Figure 3A:
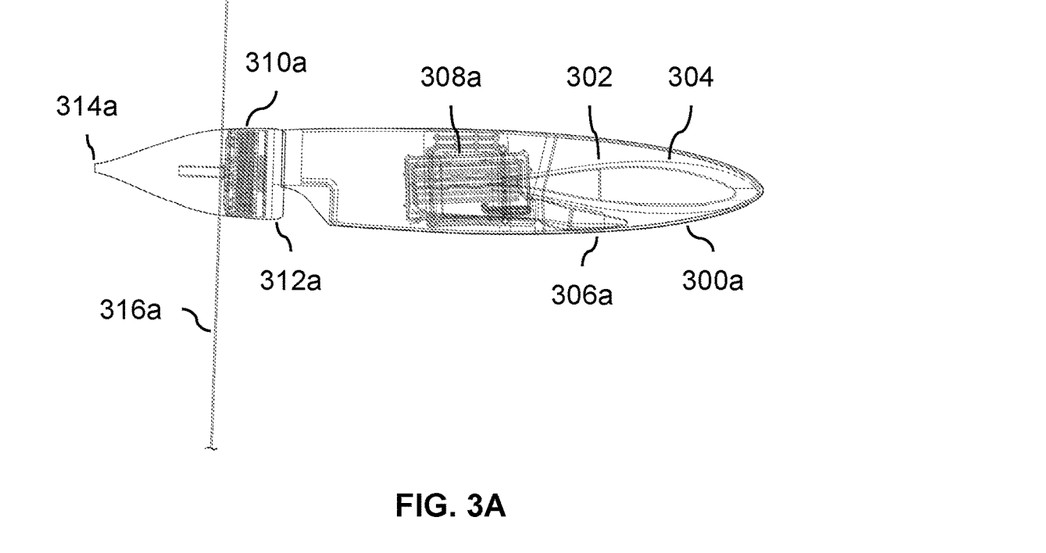
FIG. 3A is a diagram illustrating an embodiment of a tilt rotor system, including ductwork, in a forward flight position.

FIG. 3A is a diagram illustrating an embodiment of a tilt rotor system, including ductwork, in a forward flight position. In this example, the pylon portion (300a) of this tilt rotor system is configured to be attached to the end of a (main) wing. For example, the outboard tilt rotor (120) shown in FIG. 1 may be implemented as shown. A canard tilt rotor may be implemented similarly and for brevity is not described herein. For reference, the cross sections of the aft spar (302) and main wing (304) are indicated. For clarity and readability, some internal components within the tilt rotor system are not necessarily shown here.

To help the vehicle's aerodynamics, one function of the pylon portion (300a) is to create beneficial separation between the (trailing edge of the) main wing (304) and the rotor blades (316a). In this specific example, the distance between the trailing edge of the main wing (304) and the rotor blades (316a) when in forward flight position is in the range of 530-570 mm. This range is to allow a desirable and/or optimal center of thrust location from the propellers in hover position while still allowing a desirable and/or optimal aerodynamic center location from the main wing in forward flight.

In this example, the components in the tilt rotor system are air cooled. Air enters the tilt rotor system via an intake air vent (306a) that is located on the bottom surface of the pylon. The air first flows through a heat sink (308a) which is used to dissipate heat from a rotor (motor) controller (not shown) which is located in the pylon and which is used to control the rotor (motor) 310a. In this example, the battery which is used to power the rotor (310a) is stored in the fuselage and therefore the heat sink (308a) in the pylon is not used to dissipate heat from the battery. The heat sink (308a), rotor controller, and/or other (e.g., electronic) components in this example are mounted or otherwise attached to the pylon vertically (e.g., on a vertical mounting surface inside the pylon which is accessible via an access panel on the side of the pylon).

The air (which has removed at least some heat from the heat sink (308a)) then exits the pylon portion (300a) and enters the rotor portion (312a) of the tilt rotor system. The rotor (310a) is typically hotter than the heat sink (308a) and so arranging the components as shown here (with the air first coming into contact with the heat sink and subsequently the rotor) permits the heat to be dissipated from both components. It would be undesirable, for example, if the air (heating by first coming into contact with the motor, not shown here) were hotter than the heat sink and caused heat to transfer from the heated air to the heat sink.

After passing through the rotor (310a), the air exits the rotor portion (312a) of the tilt rotor via an exhaust vent (314a) at the tapered end of the rotor portion.

Figure 3B:
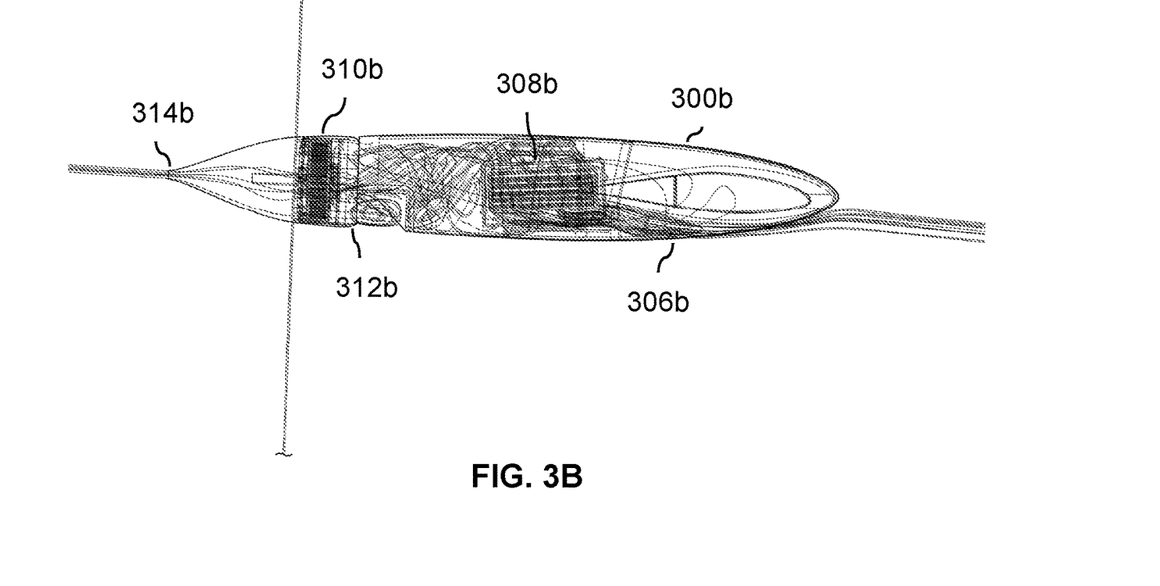
FIG. 3B is a diagram illustrating an embodiment of a tilt rotor system, including ductwork and streamlines, in a forward flight position.

FIG. 3B is a diagram illustrating an embodiment of a tilt rotor system, including ductwork and streamlines, in a forward flight position. In this diagram, streamlines are shown to illustrate how the air enters and exits the exemplary tilt rotor system. As described above, air enters the tilt rotor system via the intake air vent (306b) on the bottom surface of the pylon (300b). The air then passes through the heat sink (308b) and exits through an opening in the rear of the pylon. Some of the air then enters the rotor portion (312b) while some air exits the tilt rotor system entirely (note, for example, the streamlines in the pocket formed by the pylon portion (300b) and the rotor portion (312b)). Within the rotor portion (312b), the air flows through the rotor (310b) before exiting through the exhaust vent (314b).

Figure 3C:
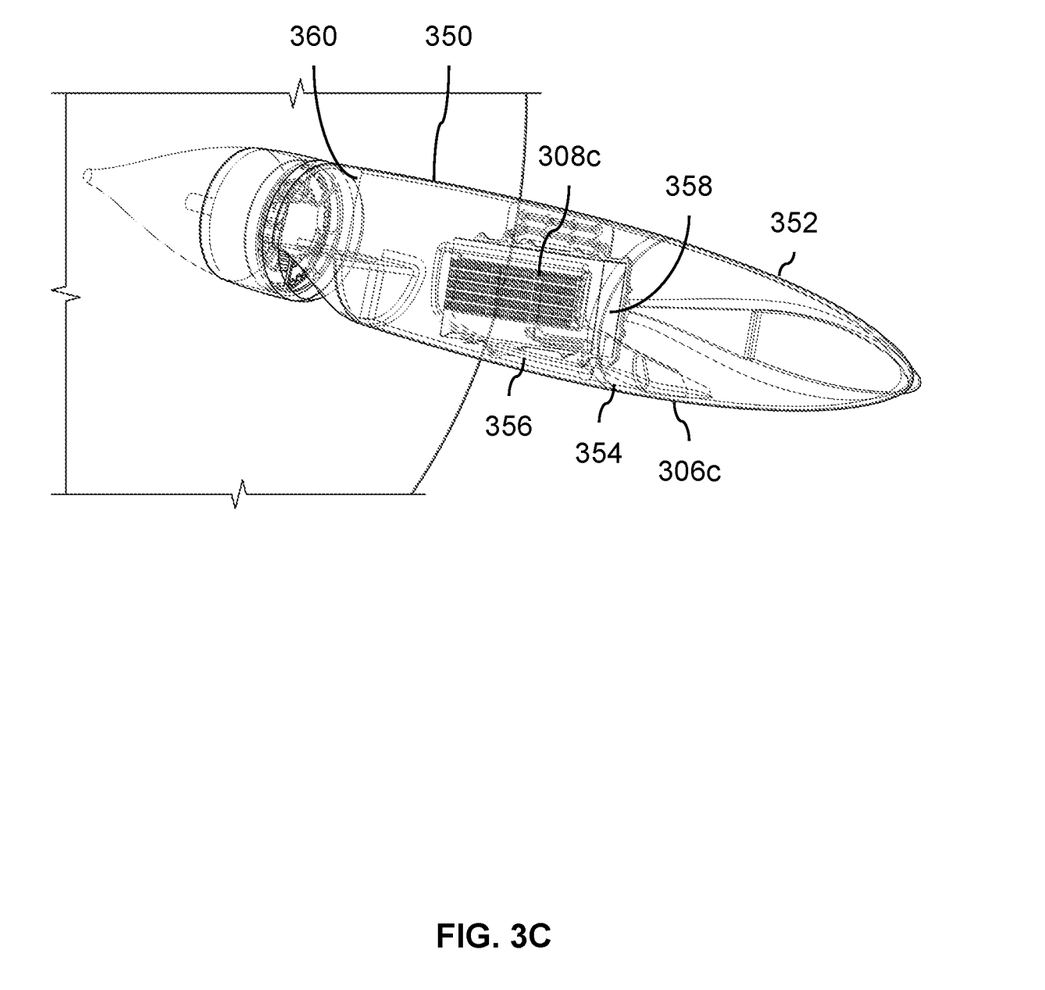
FIG. 3C is a diagram illustrating an embodiment of a tilt rotor system, including ductwork, in a forward flight position viewed at an angle.

FIG. 3C is a diagram illustrating an embodiment of a tilt rotor system, including ductwork, in a forward flight position viewed at an angle. In this diagram, the exemplary tilt rotor system is shown at an angle to better show some other features and/or aspects of the exemplary tilt rotor system. For example, in this diagram, the access panel (350) which provides access to the interior of the pylon and which is located on the side of the pylon is better shown. The access panel does not extend entirely to the front of the pylon. Rather, there is a forward portion (352) of the pylon (including, for context, the intake air vent (306c) and horizontal duct (354)) which is located forward relative to the side access panel. An air chamber (356), which guides the air through the fins of the heat sink (308c), follows the horizontal duct (354). As shown in this diagram, the air chamber (356) is adjacent to and/or exposed by the access panel (350) when the access panel is open. In some embodiments, this chamber is attached to the cover or housing (358) which includes the rotor controller, avionics, and/or other (electronic) components. In some other embodiments, this chamber is attached to the interior surface of the access panel (350).

As shown in this example, in some embodiments the pylon portion further includes an intake air vent and a heat sink, wherein air from the intake air vent in the pylon portion cools the heat sink in the pylon portion before cooling the motor in the rotor portion when the rotor portion is in the second position that is associated with the forward flight mode, and the intake air vent is disposed on a bottom surface of the pylon portion and the heat sink is attached vertically inside the pylon portion.

The following figures show the exemplary tilt rotor described above but in a hovering and/or vertical flight mode.

Figure 4A:
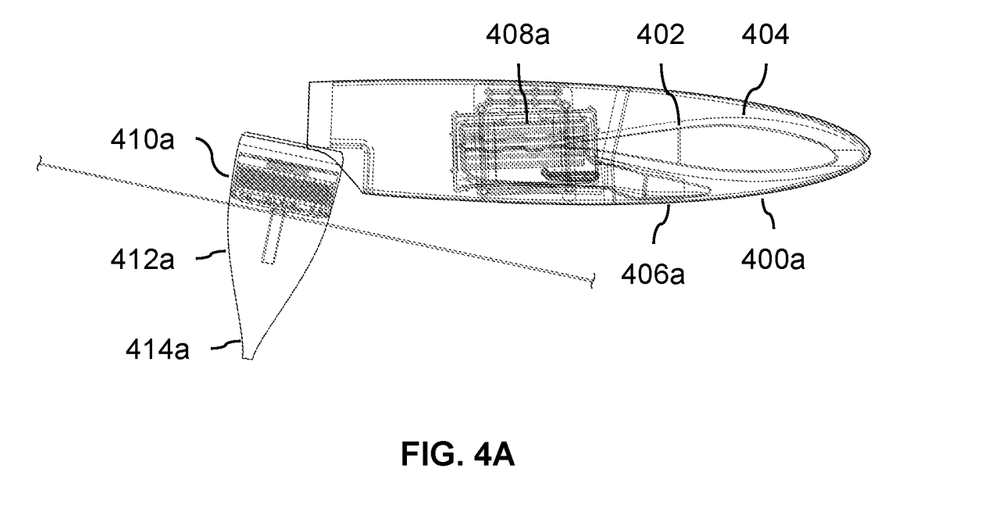
FIG. 4A is a diagram illustrating an embodiment of a tilt rotor system, including ductwork, in a vertical flight position.

FIG. 4A is a diagram illustrating an embodiment of a tilt rotor system, including ductwork, in a vertical flight position. As described above, the pylon portion (400a) of the exemplary tilt rotor system is stationary (e.g., relative to the aft spar (402) and main wing (404)) whereas the rotor portion (412a) of the tilt rotor system rotates between a vertical or hovering mode or position (shown here) and a forward flight mode or position (shown above). As such, while the intake air vent (406a) and heat sink (408a) are in the same position when compared to the above examples, the rotor portion (412a) (which includes rotor (motor) 410a and exhaust vent (414a)) is rotated relative to the examples described above.

Figure 4B:
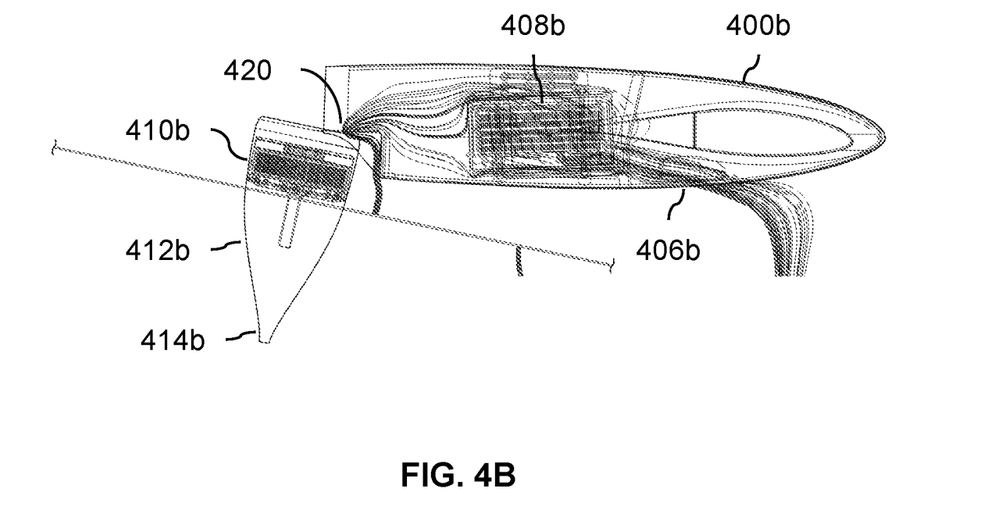
FIG. 4B is a diagram illustrating an embodiment of a tilt rotor system, including ductwork and streamlines, in a vertical flight position.

FIG. 4B is a diagram illustrating an embodiment of a tilt rotor system, including ductwork and streamlines, in a vertical flight position. In the position shown here, the airflow differs from the example described above due to the downward-tilted rotor portion (412b). Similar to the above example, air enters through intake air vent (406b) on the bottom surface of the pylon (400b). The air then passes through the heat sink (408b) and exits through an opening (420) in the rear of the pylon. Unlike the above example, however, all of the air from the pylon portion does not enter the rotor portion (412b) and pass through the rotor (410b) but rather exits the tilt rotor entirely and is drawn down through the blades of the rotor.

It is noted that the streamlines shown here only reflect the air that enters via the intake air vent. Other air (not shown) may enter the rotor portion (412b) and pass through the rotor (410b) to cool the rotors before exiting through the exhaust vent (414b). For example, as FIG. 3C shows, the rotor may be exposed to permit airflow and cooling even when the rotor portion (412b) is positioned for vertical flight. The back of the rotor portion is almost fully exposed in vertical flight and open to ambient air, which helps cooling.

Figure 4C:
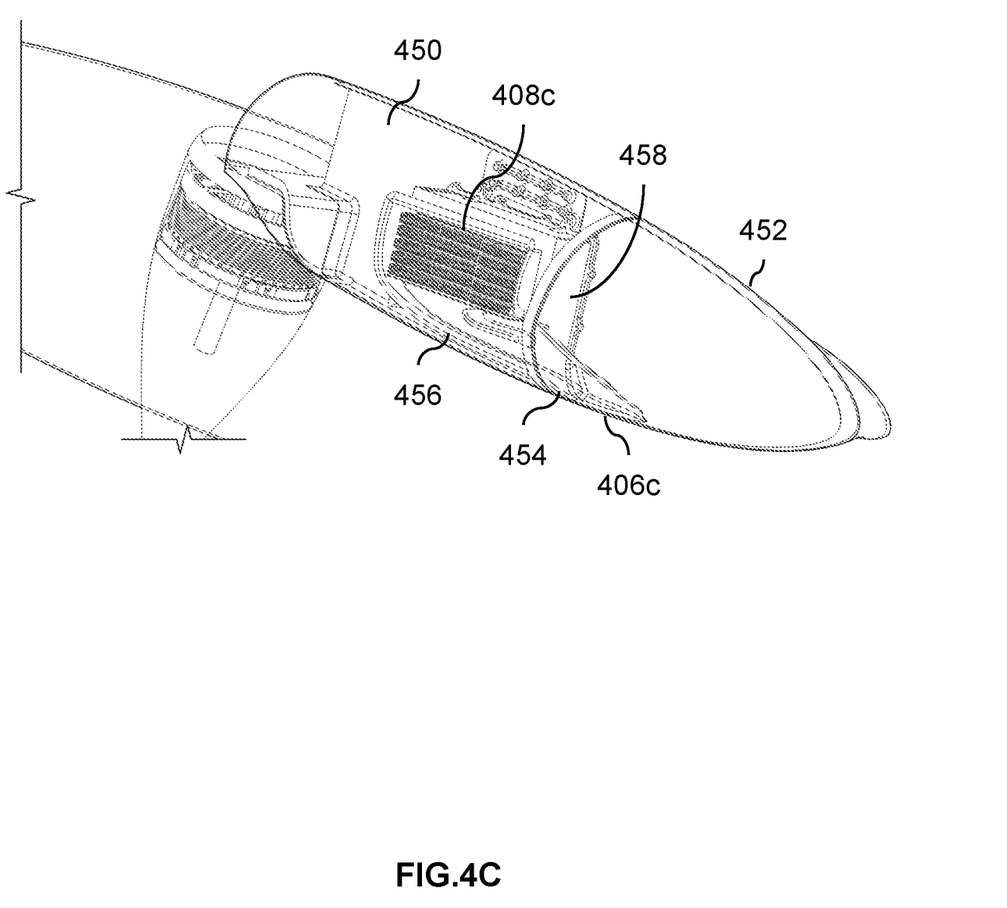
FIG. 4C is a diagram illustrating an embodiment of a tilt rotor system, including ductwork, in a vertical flight position viewed at an angle.

FIG. 4C is a diagram illustrating an embodiment of a tilt rotor system, including ductwork, in a vertical flight position viewed at an angle. As in the previous example, the access panel (450), forward portion (452) of the pylon, and intake air vent (406c) which feeds into horizontal duct (454) which in turn feeds into the air chamber (456) which surrounds the heat sink (408c) which is coupled to the cover or housing (458) of the rotor controller, avionics, and/or other components shown.

The following figures describe another tilt rotor embodiment with a different configuration and/or arrangement of components.

Figure 5A:
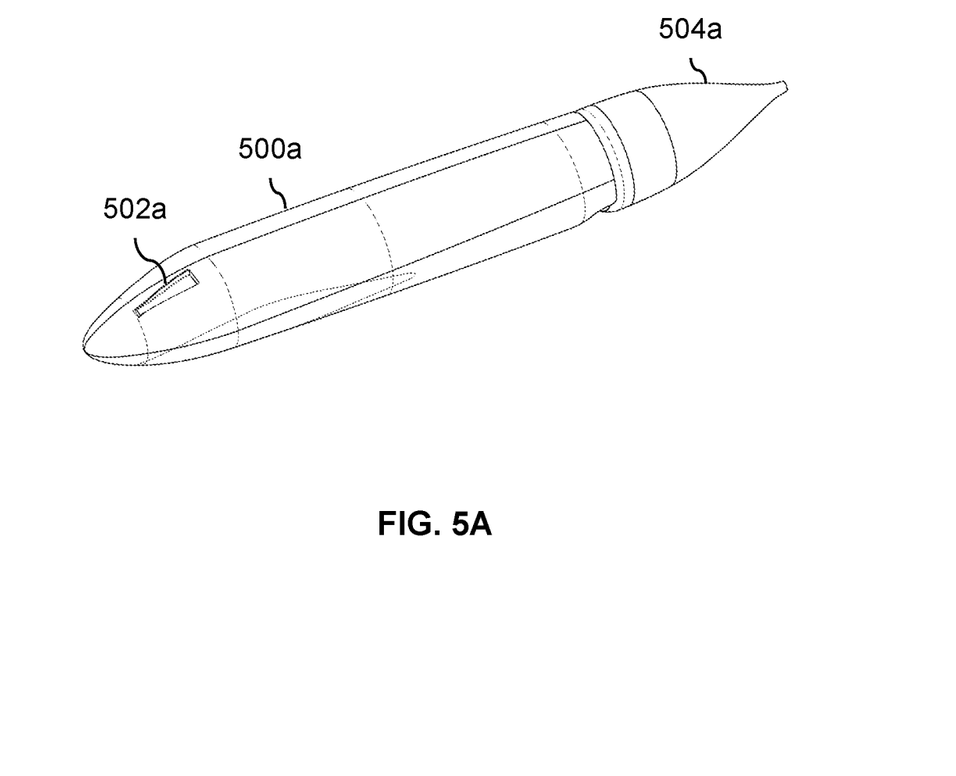
FIG. 5A is a diagram illustrating an embodiment of a tilt rotor system with an intake air vent on the top surface of the pylon.

FIG. 5A is a diagram illustrating an embodiment of a tilt rotor system with an intake air vent on the top surface of the pylon. In this example, an outboard tilt rotor system is shown. As with the previous example, the pylon portion (500a) of the tilt rotor system is configured to fit around a main wing (e.g., flush with, against, and/or otherwise in contact with an exposed spar). But in contrast with the previous example, the intake air vent (502a) in this example is located on the top surface of the pylon, not the bottom surface.

Depending upon the application and/or design objectives, one configuration may be more desirable and/or attractive than the other. For example, having an intake air vent on the bottom surface of the pylon may be desirable in situations where duct size must be minimized for drag reduction at higher speeds, as the lower surface sees higher ambient static pressure in flight. It has a further advantage of providing some limited protection from moisture ingress in rainy conditions.

In contrast, having the intake air vent on the top surface may be desirable when operations are conducted from unprepared surfaces which results in a large amount of debris being kicked up by the propwash during takeoff and landing, since the wing provides some degree of protection.

The exemplary tilt rotor system shown here is also slightly longer and slightly wider to fit more powerful components allowing more payload to be lifted while still retaining aerodynamic efficiency. The additional length also allows installation of larger diameter rotors, which are more efficient. In this specific example, the distance between the trailing edge of the main wing and the rotor blades (not shown) when in forward flight position is 500-650 mm where the range allows a desired and/or optimal center of thrust location from the propellers in hover while still allowing a desired and/or optimal aerodynamic center location from the main wing in forward flight. It is noted the vehicle as whole underwent development and/or changes, not just the tilt rotor system, resulting in a slightly different range of desired and/or optimal distances. As shown collectively in this example and the example from FIGS. 3A-4C, in some embodiments, a tilt rotor system is configured to position a blade associated with the rotor within a range of 500-650 mm that is measured from the wing when the rotor portion is in a (second) position that is associated with a forward flight mode. As described above, in some embodiments, the desired distance of the blade(s) is based at least in part on (1) an optimal center of thrust location when the rotor portion is in the second position that is associated with the forward flight mode and (2) an optimal aerodynamic center location when the rotor portion is in the first position that is associated with the vertical flight mode.

The rotor portion (504a) of the tilt rotor system is substantially the same as in the previous example and for brevity is not described herein.

Figure 5B:
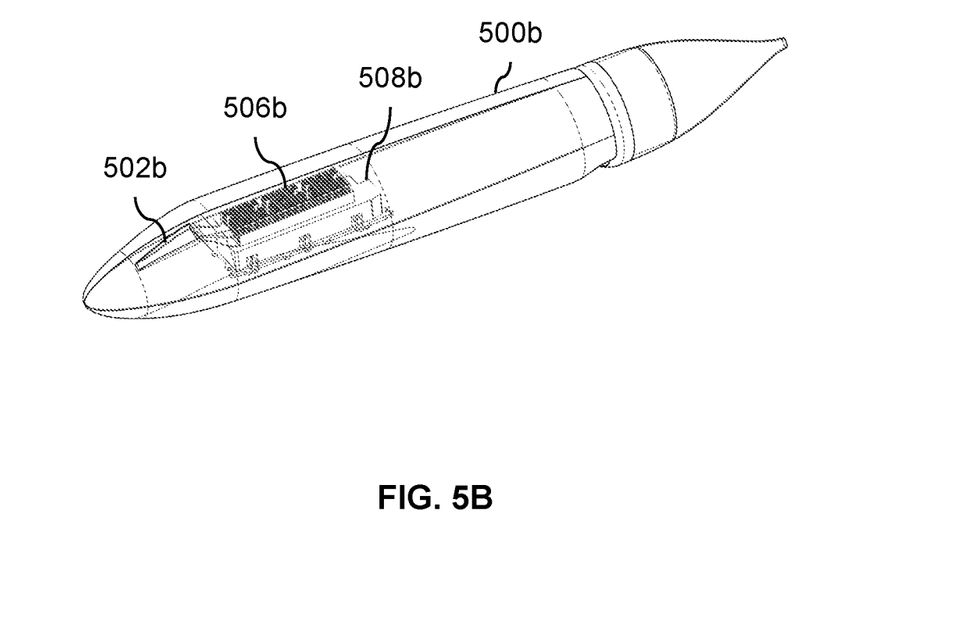
FIG. 5B is a diagram illustrating an embodiment of a tilt rotor system with components horizontally attached inside the pylon.

FIG. 5B is a diagram illustrating an embodiment of a tilt rotor system with components horizontally attached inside the pylon. In this example, the heat sink (506b) and housing (508b), which includes the rotor controller, avionics, and/or other (electronic) components, are mounted or otherwise attached to the pylon portion (500b) horizontally. Attaching or otherwise placing the components horizontally as shown here may be preferred in some applications for a variety of reasons. For example, the dimensions of the pylon portion (500b) and the total dimensions of the heat sink (506b) and housing (508b) may be better suited to the horizontal placement as shown here (e.g., the pylon portion (500b), heat sink (506b), and housing (508b) are shorter than they are taller). Or, given that the aft spar (not shown) is laid out horizontally and the mouth of the pylon fits around the spar, the heat sink (506b) and housing (508b) may fit inside the available interior space of the pylon (e.g., the upper protruding section of the pylon) better when laid out horizontally. In some applications, a vertical mounting surface may be preferred for structural reasons (e.g., the primary forces and moments of concern that act on the tilt rotor system are in the vertical direction and the vertical mounting surface may act as (additional) reinforcement).

In this particular vehicle and/or application, the components inside the pylon went from a vertical mounting to a horizontal mounting for structural reasons (e.g., needed more horizontal stiffness than the vertical arrangement could provide) as well as improved aerodynamics (e.g., the arrangement shown here allows a relatively smaller vertical cross-section height exposed to incoming airflow at the point of attachment to the wing thereby lowering the aerodynamic drag at the junction by embedding the front of the pylon into the wing's curved upper surface).

The following figure shows the airflow which enters via the intake air vent (502b) on the top surface of the pylon portion (500b) of the tilt rotor.

Figure 5C:
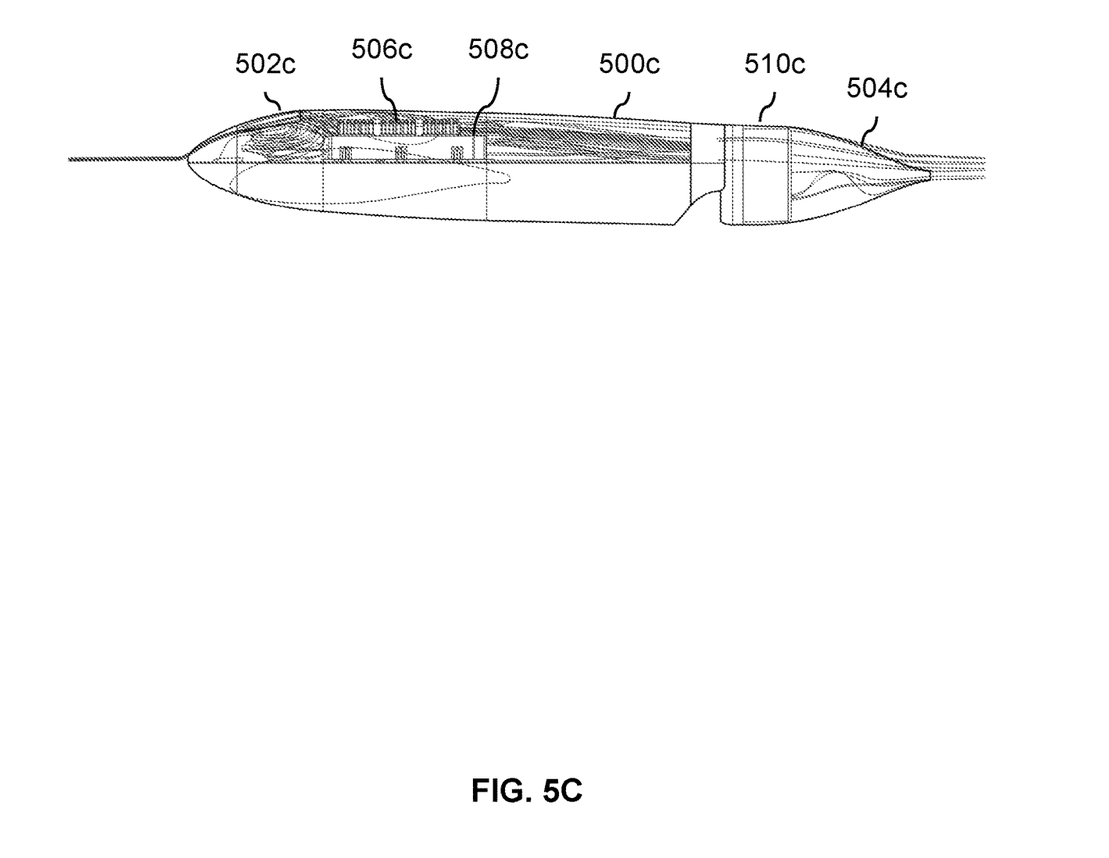
FIG. 5C is a diagram illustrating an embodiment of a tilt rotor system with components horizontally attached inside the pylon and streamlines shown.

FIG. 5C is a diagram illustrating an embodiment of a tilt rotor system with components horizontally attached inside the pylon and streamlines shown. In this example, air enters the tilt rotor system via the intake air vent (502c) that is disposed on the top surface of the pylon portion (500c). The air first passes over and removes heat from the heat sink (506c) which dissipates heat from components (e.g., the rotor controller, avionics, etc.) inside the housing (508c). The air then exits the pylon portion (500c) of the tilt rotor system and enters the rotor portion (504c) to cool the rotor (510c). As described above, the heat sink (506c) tends to be cooler than the rotor (510c) so arranging the components as shown here (e.g., with the rotor downstream of the heat sink) is desirable because heat can be removed from both.

As shown in this example, in some embodiments, the pylon portion further includes an intake air vent and a heat sink, wherein air from the intake air vent in the pylon portion cools the heat sink in the pylon portion before cooling the motor and/or rotor in the rotor portion when the rotor portion is in the second position that is associated with the forward flight mode, and the intake air vent is disposed on a top surface of the pylon portion, and the heat sink is attached horizontally inside the pylon portion.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A tilt rotor system, comprising:
  a pylon portion that includes:
    an upper protrusion that is configured to be in contact with an upper surface of a wing when the pylon portion and the wing are coupled such that the pylon portion and a rotor portion protrude aft of the wing;
    a lower protrusion that is configured to be in contact with a lower surface of the wing when the pylon portion and the wing are coupled such that the pylon portion and the rotor portion protrude aft of the wing;
    an intake air vent;
    a horizontal surface that is in a horizontal position when the wing and the pylon portion are coupled such that the pylon portion and the rotor portion protrude aft of the wing;
    a rotor controller that is coupled to the horizontal surface; and
    a heat sink that is coupled to the horizontal surface and that is configured to dissipate heat from at least the rotor controller; and
  the rotor portion, wherein:
    the rotor portion is moveably coupled to the pylon portion such that one or more rotor blades included in the rotor portion are able to move between: (1) a first position below the wing that is associated with a vertical flight mode of a vehicle that includes the tilt rotor system and the wing and (2) a second position aft of the wing that is associated with a forward flight mode of the vehicle that includes the tilt rotor system and the wing; and
    the rotor portion includes a rotor that is controlled by the rotor controller in the pylon portion, wherein:

heat sink heated air is produced by fresh air entering the intake air vent in the pylon portion and being heated by the heat sink in the pylon portion;

the heat sink heated air flows from the pylon portion to the rotor portion; and the heat sink in the pylon portion is cooler than the rotor in the rotor portion such that the heat sink heated air is able to cool the rotor in the rotor portion when the heat sink heated air flows by the rotor in the rotor portion because the heat sink heated air is cooler than the rotor in the rotor portion.

2. The tilt rotor system of claim 1, wherein the tilt rotor system is configured to position a blade associated with the rotor within a range of 500-650 mm from the wing when the rotor portion is in the second position that is associated with the forward flight mode.

3. The tilt rotor system of claim 1, wherein the tilt rotor system is configured to position a blade associated with the rotor within a desired range from the wing when the rotor portion is in the second position that is associated with the forward flight mode, wherein the desired range is based at least in part on (1) an optimal center of thrust location when the rotor portion is in the second position that is associated with the forward flight mode and (2) an optimal aerodynamic center location when the rotor portion is in the first position that is associated with the vertical flight mode.

4. The tilt rotor system of claim 1, wherein:
the intake air vent is disposed on a bottom surface of the pylon portion; and
the heat sink is attached vertically inside the pylon portion.

5. The tilt rotor system of claim 1, wherein:
the intake air vent is disposed on a top surface of the pylon portion; and
the heat sink is attached horizontally inside the pylon portion.

6. The tilt rotor system of claim 1, wherein the wing is at least partially made of a composite material.

7. The tilt rotor system of claim 1, wherein the pylon portion further includes a vertical contacting surface that is configured to be in contact with a vertical surface of an exposed spar included in the wing when the tilt rotor system and the wing are coupled.

8. A method, comprising:
providing a pylon portion associated with a tilt rotor system, wherein the pylon portion includes:
an upper protrusion that is configured to be in contact with an upper surface of a wing when the pylon portion and the wing are coupled such that the pylon portion and a rotor portion protrude aft of the wing;
a lower protrusion that is configured to be in contact with a lower surface of the wing when the pylon portion and the wing are coupled such that the pylon portion and the rotor portion protrude aft of the wing;
an intake air vent;
a horizontal surface that is in a horizontal position when the wing and the pylon portion are coupled such that the pylon portion and the rotor portion protrude aft of the wing;
a rotor controller that is coupled to the horizontal surface; and
a heat sink that is coupled to the horizontal surface and that is configured to dissipate heat from at least the rotor controller; and providing the rotor portion, wherein:
the rotor portion is moveably coupled to the pylon portion such that one or more rotor blades included in the rotor portion are able to move between: (1) a first position below the wing that is associated with a vertical flight mode of a vehicle that includes the tilt rotor system and the wing and (2) a second position aft of the wing that is associated with a forward flight mode of the vehicle that includes the tilt rotor system and the wing; and the rotor portion includes a rotor that is controlled by the rotor controller in the pylon portion, wherein:
heat sink heated air is produced by fresh air entering the intake air vent in the pylon portion and being heated by the heat sink in the pylon portion;
the heat sink heated air flows from the pylon portion to the rotor portion; and
the heat sink in the pylon portion is cooler than the rotor in the rotor portion such that the heat sink heated air is able to cool the rotor in the rotor portion when the heat sink heated air flows by the rotor in the rotor portion because the heat sink heated air is cooler than the rotor in the rotor portion.

9. The method of claim 8, wherein the tilt rotor system is configured to position a blade associated with the rotor within a range of 500-650 mm that is measured from the wing when the rotor portion is in the second position that is associated with the forward flight mode.

10. The method of claim 8, wherein the tilt rotor system is configured to position a blade associated with the rotor within a desired range that is measured from the wing when the rotor portion is in the second position that is associated with the forward flight mode, wherein the desired range is based at least in part on (1) an optimal center of thrust location when the rotor portion is in the second position that is associated with the forward flight mode and (2) an optimal aerodynamic center location when the rotor portion is in the first position that is associated with the vertical flight mode.

11. The method of claim 8, wherein:
the intake air vent is disposed on a bottom surface of the pylon portion; and
the heat sink is attached vertically inside the pylon portion.

12. The method of claim 8, wherein:
the intake air vent is disposed on a top surface of the pylon portion; and
the heat sink is attached horizontally inside the pylon portion.

13. The method of claim 8, wherein the wing is at least partially made of a composite material.

14. The method of claim 8, wherein the pylon portion further includes a vertical contacting surface that is configured to be in contact with a vertical surface of an exposed spar included in the wing when the tilt rotor system and the wing are coupled.

* * * * *